United States Patent [19]

Hsiung

[11] 3,898,164
[45] Aug. 5, 1975

[54] PERFORATED TUBE MODULE FOR LIQUID TREATMENT

[75] Inventor: Andrew K. Hsiung, Corvallis, Oreg.

[73] Assignee: Neptune Microfloc, Incorporated, Corvallis, Oreg.

[22] Filed: June 24, 1974

[21] Appl. No.: 482,107

[52] U.S. Cl. ............................................. 210/521
[51] Int. Cl.² ......................................... B01D 21/00
[58] Field of Search ............ 210/83, 519, 521, 522, 210/523, 532

[56] References Cited
UNITED STATES PATENTS

| | | | |
|---|---|---|---|
| 2,119,013 | 5/1938 | Kerns et al. | 210/521 |
| 3,251,471 | 5/1966 | Allen | 210/521 X |
| 3,385,439 | 5/1968 | Bach | 210/83 |
| 3,491,892 | 1/1970 | McCann | 210/521 |
| 3,687,298 | 8/1972 | Rozkydalek | 210/519 |
| 3,741,401 | 6/1973 | Hsiung | 210/521 |
| 3,813,851 | 6/1974 | Eder | 210/521 |

*Primary Examiner*—Theodore A. Granger
*Attorney, Agent, or Firm*—Klarquist, Sparkman, Campbell, Leigh, Hall & Whinston

[57] ABSTRACT

A device for liquid treatment, such as for separating settleable particles from liquid, comprises a first set of spaced apart generally parallel, perforated vertical sheets forming vertical channels therebetween and a second set of spaced apart inclined imperforate sheets disposed beneath the first set. A horizontal flow of liquid perpendicular to the sheets of the first set and through the perforations therein causes settleable particles of material in the liquid to settle out and slide down the inclined imperforate sheets in the second set to withdrawing means positioned therebelow.

7 Claims, 4 Drawing Figures

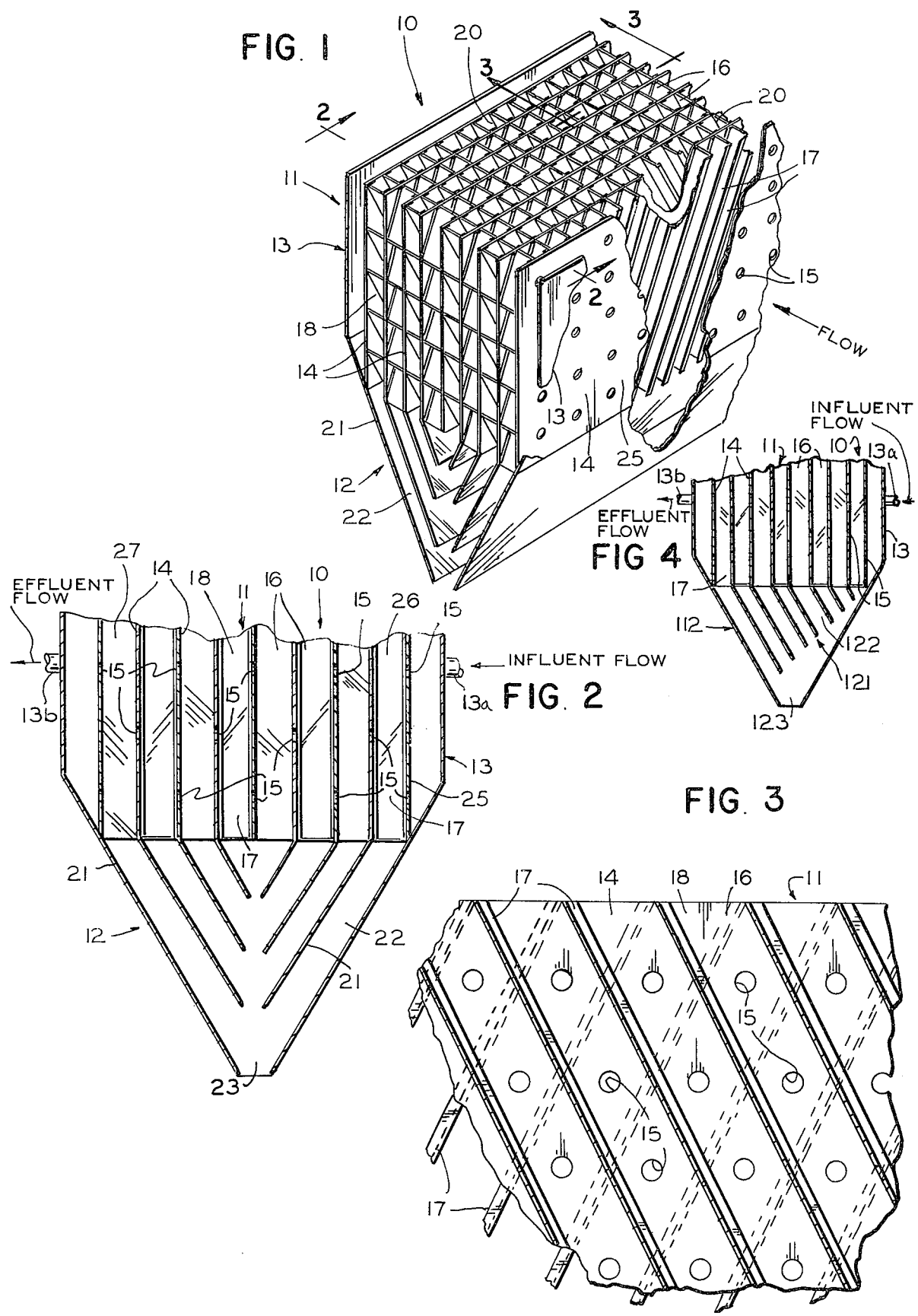

3,898,164

PERFORATED TUBE MODULE FOR LIQUID TREATMENT

BACKGROUND OF THE INVENTION

This invention relates to multichannel devices for liquid treatment and, more particularly, to such devices having perforated sheets for horizontal liquid flow therethrough.

In my U.S. Pat. No. 3,741,401, issued June 26, 1973, I disclosed a multichannel device for liquid treatment having perforated inclined sheets for liquid flow therethrough and in which solid impurities suspended in the liquid settle out on the inclined bottoms of the channels. The use of perforated sheets throughout this prior module, however, tends to reduce the settling area and also causes some flow through the thickening zone, thus to interfere to some extent with the thickening process.

Accordingly, it is the primary object of the present invention to provide a perforated tube module of the aforementioned type that will provide more settling area and that will also reduce any flow through the thickening zone to a minimum.

It is a further object of the present invention to provide a module of the aforementioned type that will provide one part for flow distribution and clarification and a separate part for sludge thickening and flow baffling and in which latter part of settled floc can gradually compact into a concentrated slurry.

It is a still further object of the present invention to provide a module of the aforementioned type that will be easier to install in a conventional settling tank than apparatus heretofore available and that will be less expensive to build.

SUMMARY OF THE INVENTION

The apparatus of the present invention comprises flow distributing and clarifying means including a first set of spaced apart generally parallel, vertical perforated sheets forming a first set of vertical channels therebetween and sludge thickening and flow baffling means including a second set of spaced apart inclined imperforate sheets disposed beneath the first set of sheets. Means are provided for distributing an influent flow of liquid so that it impinges on a first one of the sheets of the first set of sheets and thereafter flows in a direction perpendicular to such sheet through the perforations therein and into the first one of the first set of vertical channels. The flow proceeds thence through the perforations in the others of the sheets of the first set sequentially to the last one of the vertical channels whereupon it is discharged through effluent liquid withdrawal means positioned downstream of the last sheet of the first set of vertical sheets.

The channels formed by the first and second sets of sheets are in communication with each other, whereby settleable particles of material in the influent flow of liquid settle out of the liquid and slide down the imperforate sheets in the second set whence they can be withdrawn after compacting into a concentrated slurry.

BRIEF DESCRIPTION OF THE DRAWINGS

FIG. 1 is a perspective view of a settling device constructed in accordance with the present invention;

FIG. 2 is a sectional view taken along line 2—2 of FIG. 1;

FIG. 3 is a partial sectional view taken along line 3—3 of FIG. 1 and to an enlarged scale and showing the construction of the first or upper set of vertical channels; and FIG. 4 is a partial sectional view, similar to FIG. 3, of another embodiment of the invention.

DESCRIPTION OF THE PREFERRED EMBODIMENT

Referring to the drawings and in particular to FIGS. 1-3, the module 10 of the present invention includes two principal parts, an upper part 11 for flow distribution and clarification and a lower part 12 for sludge thickening and flow baffling, both of such parts 11 and 12 being mounted in a hopper shaped supporting structure 13 which is adapted to be positioned in a settling tank (not shown). An inlet 13a and an outlet 13b are provided as shown.

The first or upper part 11 of the module 10 is similar in construction to the multichannel device shown in McCann U.S. Pat. No. 3,491,892. It comprises a set of spaced apart generally parallel, vertical sheets 14 of ABS, PVC, fiberglass, wood, metal or other rigid or semi-rigid materials. The sheets 14 are provided with a plurality of perforations 15 drilled or punched therein, a preferred perforation diameter being about one inch. The perforations 15 are preferably spaced vertically and horizontally approximately 3 inches center to center. The sheets 14 form a set of vertical channels 16 therebetween. A preferred spacing between sheets 14 is about two inches.

A plurality of inclined spaced apart parallel channel-shaped plastic baffles 17 are attached to adjacent ones of the vertical sheets 14 to form inclined compartments 18 in the vertical channels 16. The baffles 17 are preferably inclined to the horizontal at an angle of about 45° to about 75° and are attached at right angles to the vertical sheets 14, the baffles 17 in each of the vertical channels 16 thus forming a set 20, the sets 20 of baffles in adjacent vertical channels 16 being inclined in opposed directions, thereby to form a rigid truss-like structure which has substantial structural strength so as to be self-supporting. The baffles 17 may be made of any rigid or semi-rigid material and may, for example, comprise 0.025 inch extruded ABS plastic channels made of Uniroyal "Kralastic," MV 1801, National Sanitation Foundation quality for use in potable water. The baffles 17 are attached to the vertical sheets 14 by a plastic solvent or by any other type of suitable plastic adhesive.

The second or lower part 12 of the module 10 comprises a second set of spaced apart inclined imperforate sheets 21 and is disposed in the supporting structure 13 beneath the first or upper part 11. In a typical configuration as shown in FIGS. 1-3, one half of the sheets 21 are inclined inwardly toward the center of the structure 13 and the other half are inclined inwardly in the opposite direction, whereby the inclined channels 22 so formed discharge particles centrally of the structure 13 and into a sludge collecting and withdrawal chamber 23 in the bottom of the supporting structure 13. The sheets 21 are also preferably spaced about two inches apart, the construction being such that the vertical channels 16 in the upper part 11 communicate with the inclined channels 22 in the lower part 12. The sheets 21 in each half are preferably inclined at an angle varying from about 45° to about 90° to the horizontal and may comprise either corrugated sheet material, flat material similar to sheets 14, on any tray-type of plate. Again, the imperforate sheets 21 may be made of ABS, PVC, fiberglass, wood, metal or other rigid or semi-rigid material.

The module 10 is positioned in the settling tank such that an influent flow of liquid entering inlet 13a impinges on the first one 25 of the sheets 14 in the upper part 11 and thence flows horizontally and perpendicularly to the sheets 14 through the perforations 15 therein, passing first into the first one 26 of the vertical channels 16 and thence through the perforations 15 in the other sheets 14 sequentially to the last vertical channel 27 in the part 11. Effluent liquid is withdrawn downstream of the last channel 27 through the outlet 13b. Settleable particles of material in the liquid settle out in the vertical channels 16 and then enter the inclined channels 22, sliding down the imperforate sheets 21 to the chamber 23, where they gradually compact into a concentrated slurry which can be withdrawn as desired.

FIG. 4 discloses an embodiment of the invention wherein the second or lower part 112 comprises imperforate sheets 121 inclined in only one direction and preferably toward the inlet side, whereby the inclined channels 122 so formed discharge particles into a sludge collecting and withdrawal chamber 123 in the bottom of the supporting structure 13. The operation of this embodiment is otherwise similar to the operation of the embodiment of FIGS. 1-3.

The module of the present invention can accommodate flow rates in the range of three to ten gallons per minute per square foot of end area for typical water clarification. Since the inclined channels in the lower part 12 are not perforated, the module 10 provides more settling area than prior devices. Furthermore, since the flow distribution and clarification part 11 of the module is separate from the sludge thickening and flow baffling part 12, any flow through the thickening zone is reduced to a minimum, thus not to interfere with the thickening process. The module is easier to install in a conventional settling tank than presently available apparatus and is less expensive to build.

I claim:

1. Apparatus for effecting separation of settleable particles from a liquid, comprising
container means having an upper part with inlet and outlet means therein;
a bottom part in said container means, said bottom part having sludge withdrawal means therein;
flow distributing and clarifying means comprising a first set of spaced apart generally parallel, vertical sheets mounted in said upper part of said container means, said sheets being of a material selected from the class consisting of rigid and semi-rigid materials, said sheets having a plurality of perforations therein, said sheets forming a first set of vertical channels therebetween,
said inlet means in said container means being adapted to distribute an influent flow of liquid so that it impinges on a first one of said sheets of said first set of sheets and thereafter
flows in a direction perpendicular to said first sheet through said perforations therein and passes into the first one of said first set of vertical channels and thence through the perforations in the others of said sheets sequentially to the last one of said first set of vertical channels,
said outlet means in said container means being positioned downstream of said last one of said first set of vertical channels, whereby settleable particles of material in said influent flow of liquid can settle out of said liquid as said liquid passes through said first set of sheets and out said outlet means;
sludge thickening and flow baffling means comprising a second set of spaced apart imperforate sheets mounted in said container means beneath said first set of sheets, said imperforate sheets being of a material selected from the class consisting of rigid and semi-rigid materials, the upper ends of said imperforate sheets abutting the lower ends of said first perforated sheets to form substantial continuations thereof, said second set of sheets being inclined to the vertical, whereby said sheets form a second set of inclined channels therebetween, each channel in said second set of channels forming a substantial continuation of a respective channel in said first set of channels, said second set of channels terminating in a chamber in said bottom part of said container means, said sludge withdrawal means being positioned in said chamber,
whereby said settleable particles of material in said influent flow of liquid which settle out of said liquid passing through said first set slide down said imperforate sheets in said second set and collect in said chamber for withdrawal by said withdrawal means.

2. Apparatus as in claim 1 further comprising a plurality of inclined spaced apart parallel baffles of a material selected from the class consisting of rigid and semi-rigid materials joining adjacent ones of said vertical sheets in said first set of sheets, said baffles forming a set in each of said vertical channels of said first set of vertical channels, each of said sets of baffles being inclined in a direction opposite to the direction of inclination of the adjacent set of baffles.

3. Apparatus as in claim 1 in which said second set of spaced apart inclined imperforate sheets comprise plane sheets.

4. Apparatus as in claim 1 in which the inclination of said imperforate sheets in said second set of sheets varies from about 45° to about 90° to the horizontal.

5. Apparatus as in claim 1 in which said second set of spaced apart inclined imperforate sheets comprise a plurality of imperforate sheets inclined inwardly of said support means in one direction and a substantially equal number of imperforate sheets inclined inwardly of said support means in the opposite direction, whereby the inclined channels formed between said sheets of said second set of sheets discharge said particles centrally of said container means and into said chamber in said bottom part thereof.

6. Apparatus as in claim 1 in which said second set of spaced apart imperforate sheets comprise a plurality of imperforate sheets inclined in one direction.

7. Apparatus as in claim 6 in which said imperforate sheets of said second set are inclined toward said influent flow of liquid.

* * * * *